United States Patent
Matsushima et al.

(10) Patent No.: US 8,833,859 B2
(45) Date of Patent: Sep. 16, 2014

(54) VEHICLE SEAT

(75) Inventors: Iwao Matsushima, Miyoshi (JP); Keiji Morimoto, Anjou (JP); Takashi Noro, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 438 days.

(21) Appl. No.: 13/273,755

(22) Filed: Oct. 14, 2011

(65) Prior Publication Data
US 2012/0098316 A1   Apr. 26, 2012

(30) Foreign Application Priority Data
Oct. 21, 2010   (JP) .................................. 2010-236216

(51) Int. Cl.
   *A47C 1/10*   (2006.01)
   *B60N 2/48*   (2006.01)

(52) U.S. Cl.
   CPC .................................. B60N 2/4817 (2013.01)
   USPC ............................. 297/391; 297/404; 297/410

(58) Field of Classification Search
   CPC ...... B60N 2/48; B60N 2/4885; B60N 2/4428; B60N 2/4808; B60N 2205/20
   USPC ......................................... 297/391, 404, 410
   See application file for complete search history.

(56) References Cited

U.S. PATENT DOCUMENTS

| | | | | |
|---|---|---|---|---|
| 8,308,236 B2 * | 11/2012 | Ishimoto et al. | .......... | 297/216.12 |
| 8,550,561 B2 * | 10/2013 | Ikeya et al. | .................... | 297/410 |
| 2006/0071528 A1 * | 4/2006 | Foelster et al. | ............... | 297/391 |

FOREIGN PATENT DOCUMENTS

| | | | | |
|---|---|---|---|---|
| DE | 3235373 A1 * | 3/1984 | ............... | B60N 1/00 |
| JP | 60151135 A * | 8/1985 | ............... | B60N 1/02 |
| JP | 10-226255 | 8/1998 | | |
| JP | 2000-093251 | 4/2000 | | |
| JP | 2007-001395 | 1/2007 | | |
| JP | 2010-194246 | 9/2010 | | |
| JP | 2010-228493 | 10/2010 | | |

OTHER PUBLICATIONS

Japanese Office action dated Mar. 11, 2014, along with an English-language translation thereof.

* cited by examiner

*Primary Examiner* — Laurie Cranmer
(74) *Attorney, Agent, or Firm* — Greenblum & Bernstein, P.L.C.

(57) ABSTRACT

A vehicle seat including: a seat back; and a headrest that is provided to an upper part of the seat back, the headrest including, a frame that is supported to be vibratable with respect to the seat back, a headrest body that is mounted on the frame, a first cover and a second cover that nip and hold the frame in cooperation with each other in the headrest body, and a mass body that is held between the first cover and the second cover.

7 Claims, 6 Drawing Sheets

VEHICLE SEAT

CROSS-REFERENCE TO RELATED APPLICATIONS

This application claims priority from Japanese Patent Application No. 2010-236216 filed on Oct. 21, 2010, the entire contents of which are incorporated herein by reference.

TECHNICAL FIELD

The present invention relates to a vehicle seat mounted in a vehicle such as an automobile.

BACKGROUND

A vehicle seat generally has a seat cushion, a seat back, and a headrest. Related art shows a headrest including a frame mounted on an upper part of the seat cushion, a headrest body mounted on the frame, and a mass body mounted vibratably with respect to the frame in the headrest body. Therefore, when the seat vibrates, the mass body vibrates with respect to the frame, such that the vibration of the seat may be decayed.

However, in the related-art, a plurality of brackets is mounted on the frame of the headrest and the mass body is connected to each of the brackets by a spring. As a result, a structure in which the mass body is mounted on the frame became complicated. Accordingly, in the related-art, a vehicle seat in which the mass body can be mounted on the frame of the headrest by a simple structure is required.

SUMMARY

Accordingly, it is an aspect of the present invention to provide a vehicle seat in which a mass body can be mounted on a frame of a headrest by a simple structure.

According to an exemplary embodiment of the present invention, there is provided a vehicle seat including: a seat back; and a headrest that is provided to an upper part of the seat back, the headrest including, a frame that is supported to be vibratable with respect to the seat back, a headrest body that is mounted on the frame, a first cover and a second cover that nip and hold the frame in cooperation with each other in the headrest body, and a mass body that is held between the first cover and the second cover.

DETAILED DESCRIPTION

Figure 1:
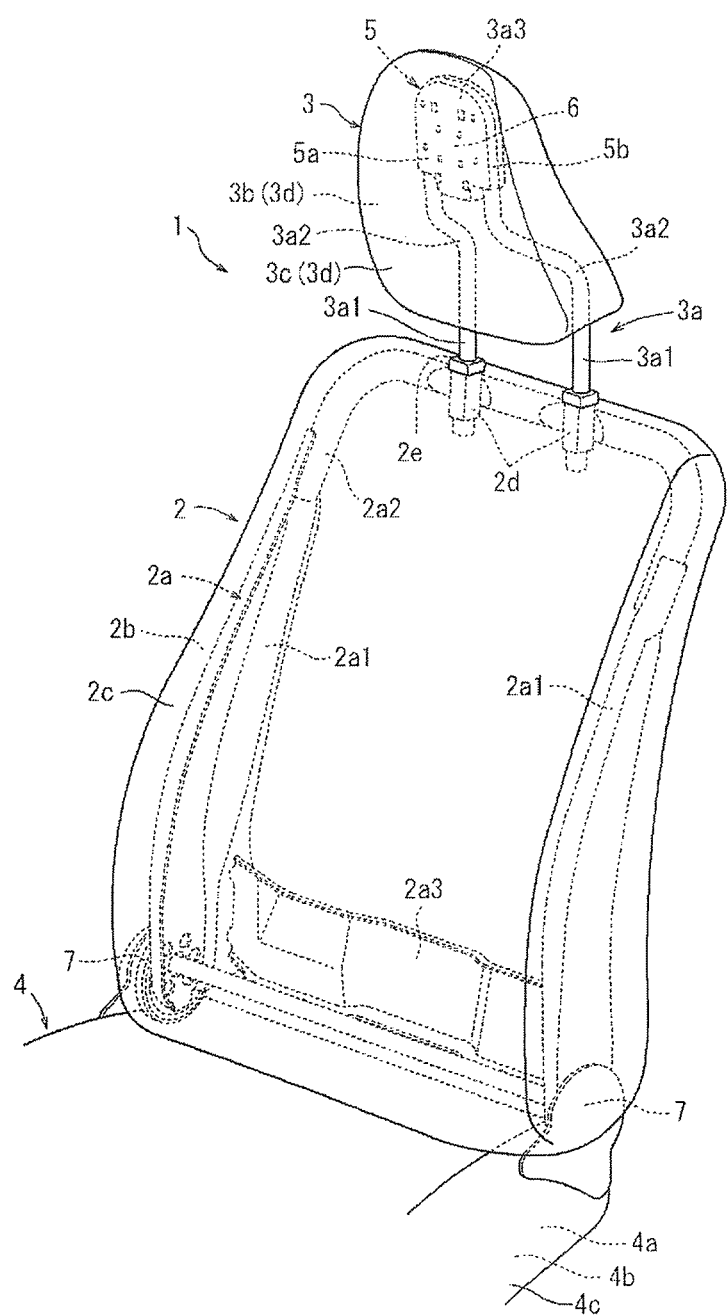
FIG. 1 is a partial perspective view of a vehicle seat.

An exemplary embodiment of the present invention will be described with reference to FIGS. 1 to 7. As shown in FIG. 1, a vehicle seat 1 mounted on the vehicle such as an automobile includes a seat cushion 4, a seat back 2, and a headrest 3. The seat back 2 is connected to a rear part of the seat cushion 4 by a reclining device such that an angle of the seat back 2 can be adjustable.

As shown in FIG. 1, the seat back 2, the headrest 3, and the seat cushion 4 respectively includes frames 2a to 4a, pads 2b to 4b mounted on the frames 2a to 4a, and covers 2c to 4c covering the pads 2b to 4b. The frame 2a of the seat back 2 includes a pair of left and right side frames 2a1, an upper frame 2a2 that connects upper portions of the side frames 2a1, and a lower frame 2a3 that connects lower portions of the side frames 2a1.

Figure 4:
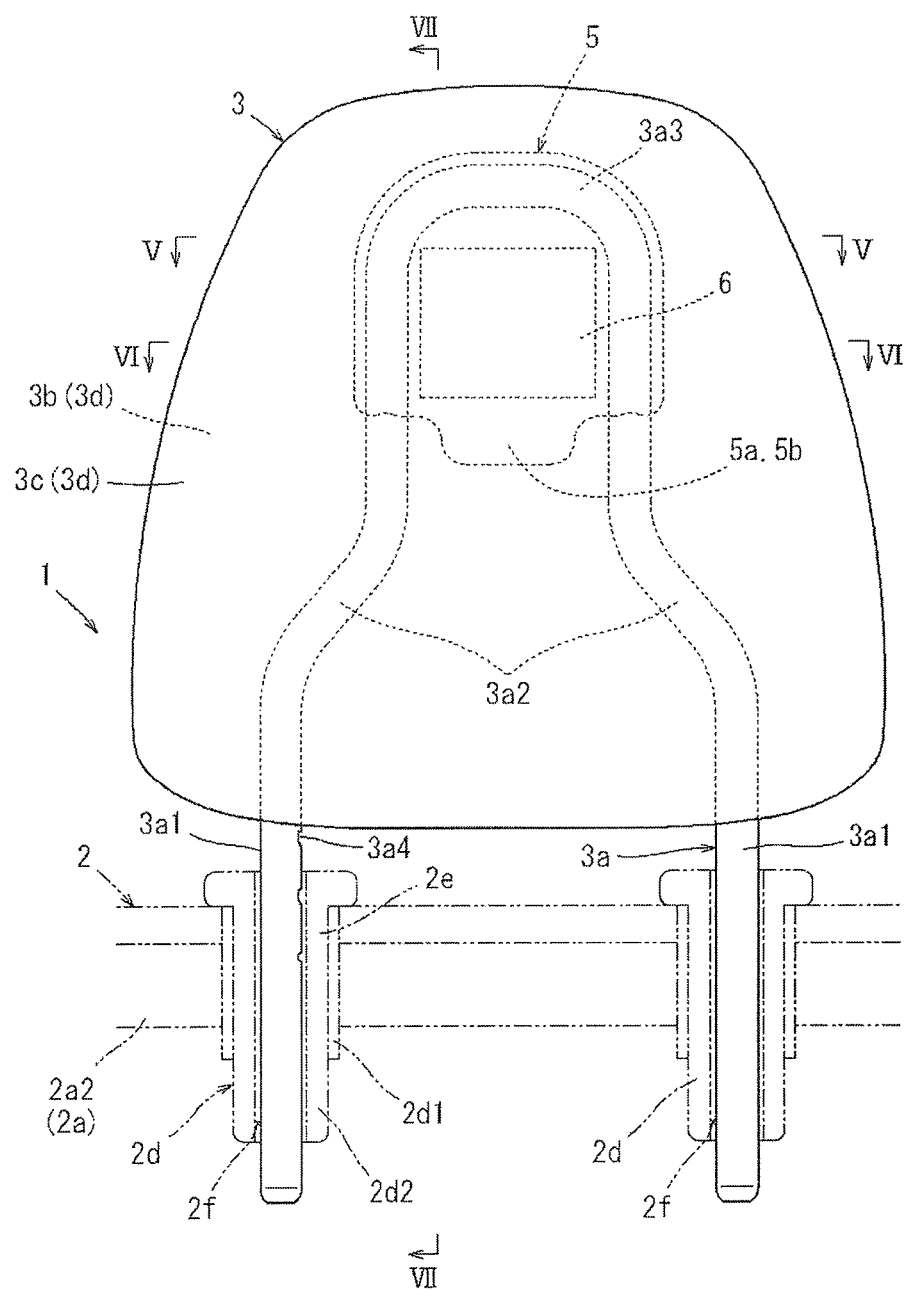
FIG. 4 is a front view of a part of a seat back and the headrest.

As shown in FIGS. 1 and 4, a pair of brackets 2d is mounted on the upper frame 2a2. The brackets 2d respectively includes a cylinder member 2d1 made of metal and having a cylindrical shape, and s support member 2d2 made of a resin and inserted into the inside of the cylinder member 2d1. A stopper 2e that adjusts the height of the headrest 3 is provided to one of the support members 2d2.

Figure 3:
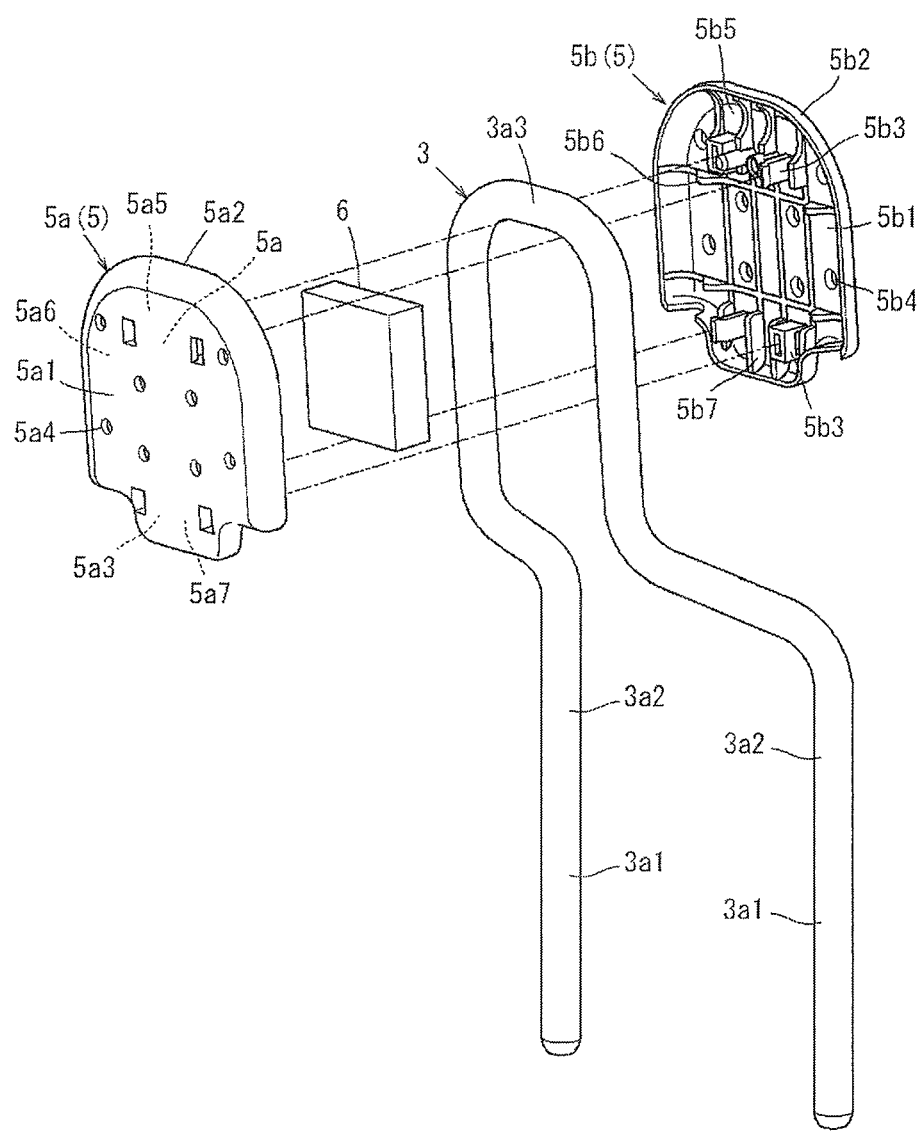
FIG. 3 is an exploded perspective view of the headrest.

As shown in FIGS. 3 and 4, a frame 3a of the headrest 3 is formed with a pipe member (a hollow member). The frame 3a integrally includes a pair of stays 3a1, a pair of longitudinal portions 3a2 that extend upwards from each stay 3a1, and a connection portion 3a3 that connects upper portions of the pair of longitudinal portions 3a2. The stay 3a1 is inserted into the bracket 2d. A plurality of grooves 3a4 is formed to one of the stays 3a1. The stay 3a1 is positioned with respect to the bracket 2d by the groove 3a4 and the stopper 2e. As a result, a height of the headrest 3 with respect to the seat back 2 may be adjusted.

As shown in FIG. 4, a gap 2f is formed between the stay 3a1 and the bracket 2d. For example, the gap 2f is formed between the stay 3a1 and the support member 2d2 or between the support member 2d2 and the cylinder member 2d1. The stay 3a1 is supported to be tiltable with respect to the seat back 2 in a front-back direction or a left-right direction by the gap 2f.

Figure 2:
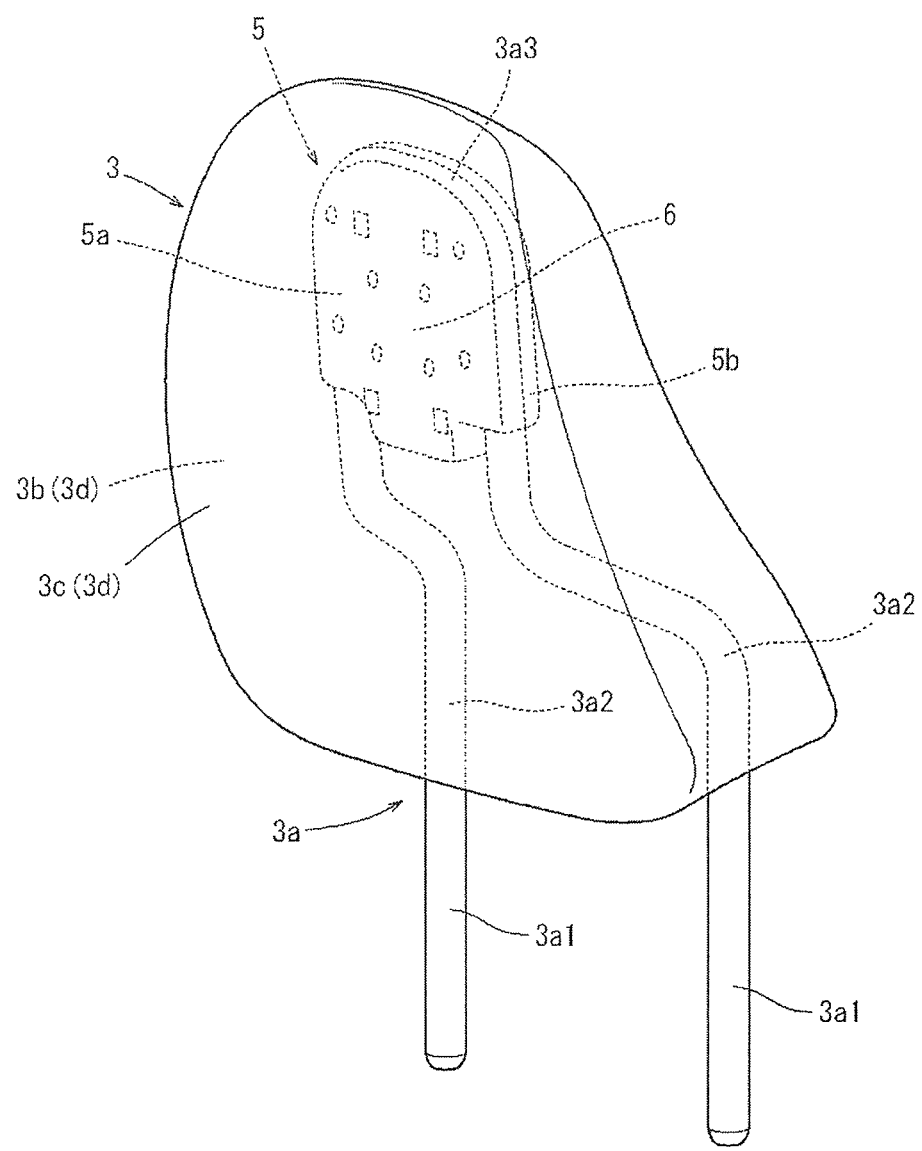
FIG. 2 is a perspective view of a headrest.

As shown in FIG. 2, the longitudinal portion 3a2 of the frame 3a extends in the headrest body 3d from the stays 3a1. The longitudinal portion 3a2 extends upwards, and toward the front side and a width center direction from the stay 3a1. A width interval between the upper portions of the pair of longitudinal portions 3a2 is smaller than a width interval between the lower portions of the longitudinal portions 3a2. A mass body 6 is mounted between the upper portions of the pair of longitudinal portions 3a2 and the connection portion 3a3.

As shown in FIGS. 2 and 4, the mass body 6 is made of a metallic material such as steel, and is solid. The mass body 6 having a substantially rectangular parallelepiped shape is mounted on the upper portion of the frame 3a by a cover body 5. The mass body 6 is positioned in the upper portion of the headrest body 3d, thereby allowing the center of gravity of the headrest 3 to be positioned further away from the bracket 2d. Accordingly, when the seat back 2 vibrates, the headrest 3 may easily vibrate with respect to the seat back 2 by an inertial force.

As shown in FIGS. 2 and 3, the cover body 5 includes a first cover 5a and a second cover 5b. The first cover 5a and the second cover 5b are made of light-weight resin materials, and respectively include body plates 5a1, 5b1 and end edges 5a2, 5b2. The body plate 5a1 covers a front surface of the upper portion of the longitudinal portion 3a2 of the frame 3a and a front surface of the connection portion 3a3. The body plate 5b1 covers a rear surface of the upper portion of the longitudinal portion 3a2 of the frame 3a and a rear surface of the connection portion 3a3. The end edges 5a2, 5b2 respectively extend from outer peripheries of the body plates 5a1, 5b1 to cover a lateral surface of the upper portion of the longitudinal portion 3a2 and the upper surface of the connection portion 3a3.

Figure 5:
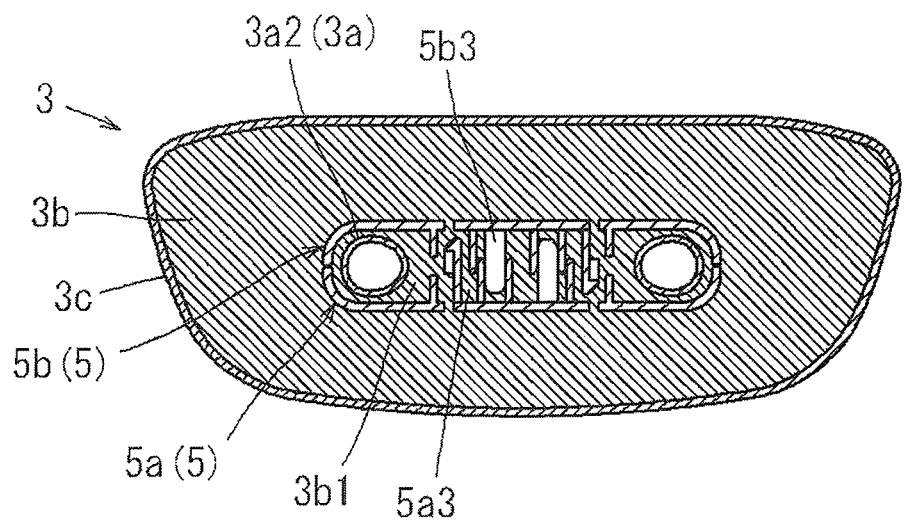
FIG. 5 is a cross-sectional view taken along line V-V of FIG. 4.

As shown in FIGS. 3 and 5, in the body plates 5a1, 5b1, engaging portions 5a3, 5b3 and ribs 5a5 to 5a7 and 5b5 to 5b7 are integrally formed, respectively. The engaging portions 5a3, 5b3 extend toward each other to be engaged with each other. As a result, the first cover 5a and the second cover 5b nip and hold the frame 3a in the front-rear direction.

Figure 6:
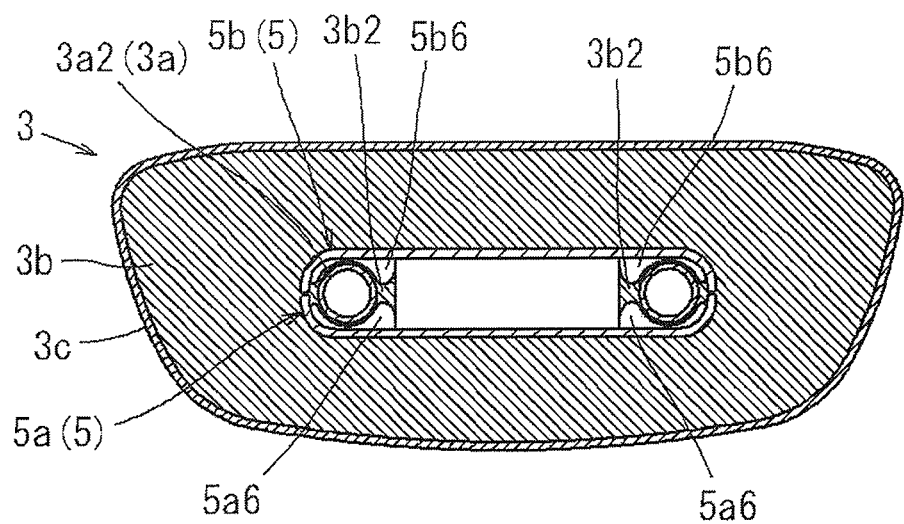
FIG. 6 is a cross-sectional view taken along line VI-VI of FIG. 4.
Figure 7:
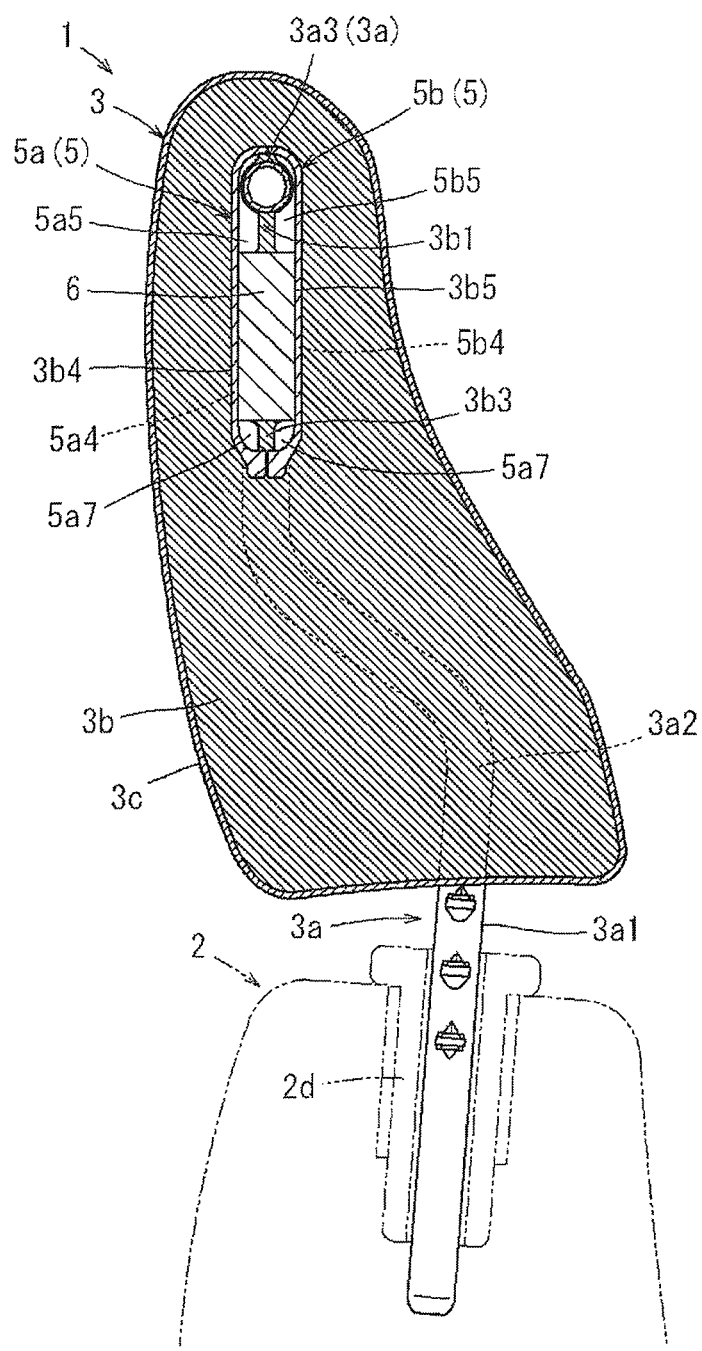
FIG. 7 is a cross-sectional view taken along line VII-VII of FIG. 4.

As shown in FIGS. 3 and 7, the ribs 5a5, 5b5 protrude around the connection portion 3a3 of the frame 3a to cover the connection portion 3a3. Lower ends of the ribs 5a5, 5b5 are close to a top surface of the mass body 6. The ribs 5a7, 5b7 extend from the body plates 5a1, 5b1, respectively, to be close to a bottom surface of the mass body 6. The ribs 5a6, 5b6 protrude around the longitudinal portions 3a2 of the frame 3a to cover the longitudinal portions 3a2 as shown in FIGS. 3 and 6. Ends of the ribs 5a6, 5b6 are close to a side surface of the mass body 6.

A plurality of holes 5a4, 5b4 are formed to the body plates 5a1, 5b1 as shown in FIG. 3. The holes 5a4, 5b4 penetrate the cover body 5 to connect the inside and the outside thereof and face the front surface or the rear surface of the mass body 6. The holes 5a4 and 5b4 allow liquid resin, which is a raw material of the pad 3b, to be introduced into the inside of the cover body 5 when the pad 3b is molded.

As shown in FIGS. 5 to 7, the pad 3b is made of a foam resin (for example, a foam urethane resin). The foam resin is formed by heating and foaming the liquid resin. The pad 3b covers an outer periphery of the cover body 5. An outer surface of the pad 3b is covered by the cover 3c. The cover 3c is set to a mold when the liquid resin is heated and is mounted integrally with the pad 3b. Alternatively, the cover 3c may be mounted on the outer surface of the pad 3b after the pad 3b is molded.

Some of the liquid resin, which is the raw material of the pad 3b, is introduced into the inside of the cover body 5 through the holes 5a4 and 5b4 as shown in FIGS. 5 to 7. The liquid resin is foamed inside the cover body 5 to become a part of the pad 3b. The part of the pad 3b includes an upper portion 3b1, a lower portion 3b3, a front portion 3b4, and a rear portion 3b5 as shown in FIG. 7, and left and right portions 3b2 as shown in FIG. 6.

As shown in FIG. 7, the upper portion 3b1 fills between the top surface of the mass body 6 and the cover body 5. The lower portion 3b3 fills between the bottom surface of the mass body 6 and the cover body 5. The front portion 3b4 fills between the front surface of the mass body 6 and the first cover 5a. The rear portion 3b5 fills between the rear surface of the mass body 6 and the second cover 5b. As shown in FIG. 6, the left and right portions 3b2 fill between the left and right surfaces of the mass body 6 and the cover body 5. Accordingly, the mass body 6 may be prevented from vibrating or may be positioned with respect to the cover body 5.

Referring to FIG. 4, the vehicle seat 1 may vibrate when the vehicle travels. In this case, the headrest 3 vibrates with respect to the seat back 2 by the inertial force. As a result, the vibration of the vehicle seat 1 may be attenuated by the vibration of the headrest 3 with respect to the seat back 2.

The vibration applied to the vehicle seat 1 has different characteristics depending on a vehicle type. The weight of the mass body 6 is determined suitably according to the vibration characteristic. The shape of the mass body 6 may vary depending on the weight. However, even when the shape is different, the mass body 6 is held in the cover body 5 and is positioned with respect to the cover body 5 by the pad 3b.

As described above, the vehicle seat 1 for the vehicle includes the headrest 3 that is provided in the upper part of the seat back 2 as shown in FIGS. 1 and 2. The headrest 3 includes the frame 3a that is supported to be vibratable with respect to the seat back 2, the headrest body 3d that is mounted on the frame 3a, the first cover 5a and the second cover 5b that nip and hold the frame 3a in cooperation with each other in the headrest body 3d, and the mass body 6 that is held between the first cover 5a and the second cover 5b.

Therefore, the mass body 6 can be mounted on the frame 3a by the first cover 5a and the second cover 5b, thereby simplifying the mounting structure. Further, the mass body 6 can vibrate with respect to the seat back 2 together with other members of the headrest 3. As a result, when the vehicle seat 1 vibrates, the headrest 3 vibrates with respect to the seat back 2. Therefore, the vibration of the vehicle seat 1 can be attenuated.

As shown in FIG. 7, the headrest body 3d includes the pad 3b made of the foam resin. A part of the pad 3b fills between the cover body 5, which includes the first cover 5a and the second cover 5b, and the mass body 6. Therefore, the mass body 6 is prevented from vibrating with respect to the cover body 5 by the part of the pad 3b. Accordingly, the noise which may be generated when the mass body 6 vibrates with respect to the cover body 5 can be suppressed.

As shown in FIGS. 2 and 3, the holes 5a4 and 5b4 that allow the liquid resin, which is the raw material of the foam resin, to be introduced into the cover body 5 are formed to the cover body 5. Therefore, when the pad 3b is molded, the liquid resin is introduced into cover body 5 through the holes 5a4 and 5b4 and then the liquid resin is foamed, such that the pad 3b may be formed between the cover body 5 and the mass body 6.

The present invention is not limited to the exemplary embodiment described above, and may be implemented as the following exemplary embodiment. For example, the first cover 5a and the second cover 5b may be coupled to each other by a boss provided at one of the first cover and the second cover, and a nut mounted on the boss. The first cover 5a and the second cover 5b may be coupled to each other by a deposition such as a vibration deposition.

The cover body 5 may include the first and second covers that nip and hold only one of the longitudinal portions 3a2 of the frame 3a or only the connection portion 3a3 of the frame 3a. The cover body 5 may include the first and second covers that nip and hold the longitudinal portion 3a2 of the frame 3a in the left-right direction.

The first cover 5a and the second cover 5b may be connected by a hinge portion and may be a structure that can nip and hold the frame 3a by transforming the hinge portion. It is not necessary that the space between the cover body 5 and the mass body 6 is filled by the pad 3b.

The seat 1 may be mounted on a ship or an aircraft.

What is claimed is:
1. A vehicle seat comprising:
   a seat back; and
   a headrest that is provided to an upper part of the seat back, the headrest including:
      a frame that is supported to be vibratable with respect to the seat back;
      a headrest body that is mounted on the frame;
      a first cover and a second cover that nip and hold the frame in cooperation with each other in the headrest body; and
      a mass body that is held between the first cover and the second cover, wherein the headrest body includes a pad made of a foam resin, and wherein a part of the pad is provided between a cover body, which includes the first cover and the second cover, and the mass body.

2. The vehicle seat according to claim 1,
wherein at least one hole is defined in the cover body to allow a liquid resin, which is a raw material of the foam resin, to be introduced into the cover body.

3. The vehicle seat according to claim 2,
wherein the at least one hole is a plurality of holes.

4. The vehicle seat according to claim 1,
wherein the mass body is provided in an upper portion of the headrest body.

5. The vehicle seat according to claim 1, wherein the first cover and the second cover each include a plurality of engaging portions and ribs to nip and hold the frame.

6. The vehicle seat according to claim 5, wherein the engaging portions of each of the first cover and the second cover extend toward each other for engagement such that the first cover and the second cover nip and hold the frame.

7. The vehicle seat according to claim 5, wherein the ribs of each of the first cover and the second cover extend toward the mass body such that the ribs are proximate upper, lower and side surfaces of the mass body.

\* \* \* \* \*